Patented Oct. 25, 1938

2,134,295

UNITED STATES PATENT OFFICE 2,134,295

METHOD OF PRESERVING FULL DRESSED POULTRY

Mikail T. Zarotschenzeff, New York, N. Y., assignor to Z Pack Corporation, a corporation of Delaware No Drawing. Application May 28, 1936, Serial No. 82,324

2 Claims. (Cl. 99—194)

The present invention relates to the preservation of poultry in the fully dressed state, as distinguished from the methods now commonly employed wherein the birds are frozen and preserved in the undrawn state. In these present methods, wherein the poultry is undrawn, the chief reason for the freezing and preserving of the fowl in its undrawn state is to reduce bacterial infection which would otherwise take place where the flesh is cut to enable the entrails to be drawn. Not only is the cut flesh a favorable place for the growth of bacteria, but the inner carcass of the fowl also constitutes a region in which rapid bacterial growth is quite pronounced.

In accordance with the present invention, it is proposed to provide a method wherein poultry may be effectively preserved in the fully dressed and drawn state and under such conditions as to effectively inhibit bacterial growth.

In existing methods now followed in the freezing and storage of poultry, the fact that the birds are undrawn results in approximately twenty-five to thirty per cent. of the products being handled in the form of waste, not only adding to the transportation and storage charges, but substantially increasing the amount of bulk to be frozen. Moreover, before the birds can be offered for sale, they must be defrosted. After defrosting, bacterial growth increases rapidly, thus necessitating the quick sale of the product in order to afford the consumer as good quality as possible. When the defrosted bird has been drawn, bacterial growth increases even more rapidly than in the defrosted state, thus requiring the prompt consumption of the bird even more than when the bird is in the undrawn state.

By means of the present invention, the handling of the waste represented by the entrails is eliminated and the cleaning and preparation of the birds by skilled operators at central plants is made possible. Moreover, by means of the present invention, bacterial contamination is substantially reduced and a very superior product obtained.

Not only do the foregoing advantages result from the present invention, but a further and material advantage resides in the fact that the freezing of the birds is accomplished more effectively and economically than with undrawn birds.

In addition to the foregoing objects and advantages of the present invention, others will be apparent as it is described specifically in the following specification and in order that the invention may be more fully understood, one method of carrying out the invention will now be described.

At the outset it is to be observed that this invention not only applies to poultry, but to all void containing flesh products such as game, etc., wherein preservation of the product in the whole state is desired. The poultry or other product is first cleaned by preferably thoroughly removing the feathers in any well known manner.

The entrails are then removed, this being done by skilled labor in view of the fact that the work is centralized at the source of the product rather than distributed to retailers and consumers who are less proficient in so doing. The carcass is then trimmed, that is, the extremities are severed to eliminate the parts of the carcass which are of no value. The resulting carcass is then in a condition ready to be cooked. The carcass which has thus been dressed, drawn and trimmed is subjected to a quick freezing operation, which is preferably carried out by means of sprays of a suitable refrigerating fluid. In practice, a solution of common salt is used for this purpose because of the fact that it is cheap, an excellent germicide, and, in solution, is susceptible of existing in liquid form at sufficiently low temperatures to enable quick freezing operations to be carried out. In practice, the temperature of this brine solution can be maintained at minus 5° F. and has been found to be a particularly effective temperature for quick freezing the poultry or other product.

If desired, the carcasses can be racked or otherwise arranged in convenient groups and forms to facilitate packing and storing, or they may be frozen individually either in frames or in a free state. The brine sprays are directed against the product and preferably the product is so disposed as to have the brine sprays directed into the voids or interior thereof. In practice, a chicken weighing two and one-half pounds will be completely frozen in less than one hour, while a duck weighing four pounds will be completely frozen in less than two hours. Inasmuch as the brine spray or fog is directed over the surface of the carcass, as well as into the interior or void therein, the entire surface, as well as the interior, is subjected to the antiseptic and germicidal properties of the brine solution, thus effectively inhibiting bacterial growth and insuring full flavor and high quality in the carcass. Actual tests have shown that the bacterial count, even after six months of subsequent storage, is several hundred times less than on poultry frozen in the ordinary way. Likewise, the rancidity of the carcass is greatly reduced, increasing the palatability correspondingly.

To improve the product, it may be washed in clean water after the quick freezing operation has been completed, thus removing the surplus of salt brine on the surface. Moreover, after thus washing the carcass, a fresh water glaze may be applied thereto in the usual fashion, preventing the product from drying out and preserving it effectively against contamination or other deleterious conditions. Moreover, after glazing, the carcass may be wrapped in a suitable material to prevent the sublimation of the glaze.

Inasmuch as a small amount of salt remains imbedded in the surface of the carcass, the antiseptic properties of the salt inhibit bacterial growth and prevents the formation of slime and mold.

In actual practice, the quick freezing operation is preferably carried out, as above noted, by means of a spray or fog of a brine solution which is preferably so directed with respect to the carcass that all impurities are washed out of the carcass and an effective cleaning action results. The brine, before recirculation, should be filtered in order to remove impurities therefrom before redirecting it upon the products to be frozen.

It will thus be seen that, among the substantial advantages resulting from the present invention, are included the elimination of the handling of waste represented by the entrails of the fowl or carcass, the facility with which the carcass is prepared for freezing inasmuch as the complete operation of cleaning, drawing and trimming the carcass may be done at central stations where experts may be used, and the further advantages of providing a more effective and rapid freezing of the product by reason of the drawing of the carcasses, as well as the effective means by which bacterial contamination is substantially reduced. The brine spray or fog is preferably so directed that the voids or interior of the carcass may receive an adequate amount of the refrigerating medium to effectively cleanse and refrigerate the interior of the carcass.

While the invention has been described with relation to the specific steps outlined above, it is not to be limited, save as defined in the appended claims.

I claim:

1. The process of preserving animal carcasses which comprises cleaning and drawing the entrails thereof, and quick freezing the resulting carcasses by directing a fluid freezing medium having antiseptic properties against the inner and outer surfaces of the carcasses to flush and sweep the surfaces and cause a rapid flow of the freezing medium over the carcasses.

2. The method of preserving fowls which comprises cleaning and eviscerating a fowl, and directing sprays of a refrigerating medium against the outer surfaces and into the visceral cavity of the fowl to sweep and cause a rapid movement of the refrigerating medium over the surfaces, whereby accumulation of the warmed refrigerant is avoided.

MIKAIL T. ZAROTSCHENZEFF.